(No Model.)  2 Sheets—Sheet 1.

F. M. STANLEY.
CAR COUPLING.

No. 490,515.  Patented Jan. 24, 1893.

WITNESSES:
Paul Johot
C. Sedgwick

INVENTOR
F. M. Stanley
BY
[signature]
ATTORNEYS.

(No Model.) 2 Sheets—Sheet 2.
F. M. STANLEY.
CAR COUPLING.
No. 490,515. Patented Jan. 24, 1893.
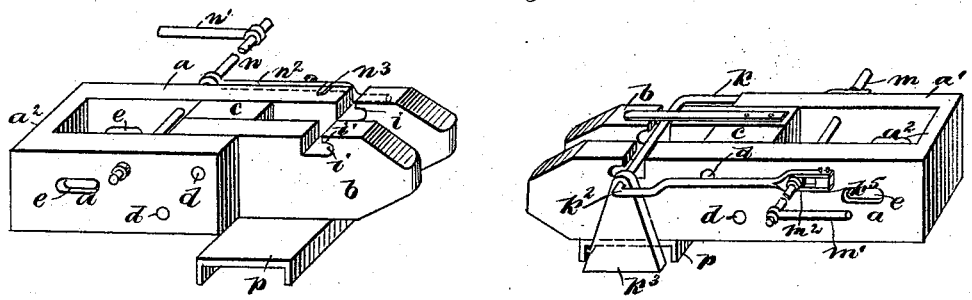
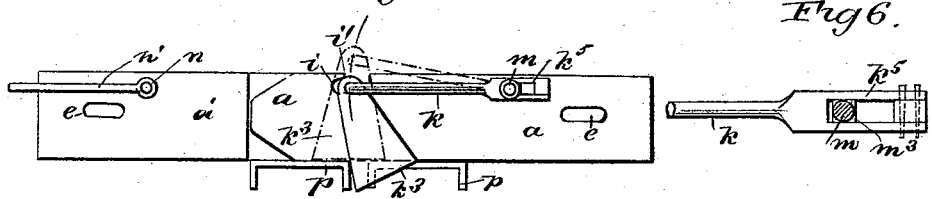 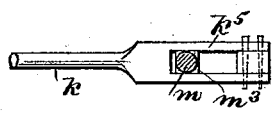
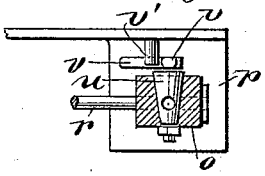 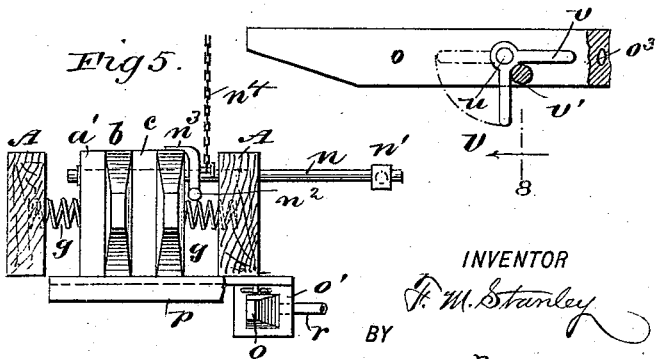
WITNESSES:
Paul Johns
E. Sedgwick
INVENTOR
F. M. Stanley
BY
[signature]
ATTORNEYS.

UNITED STATES PATENT OFFICE.

FRANK M. STANLEY, OF GUTHRIE, OKLAHOMA TERRITORY.

CAR-COUPLING.

SPECIFICATION forming part of Letters Patent No. 490,515, dated January 24, 1893.

Application filed April 7, 1892. Serial No. 428,128. (No model.)

*To all whom it may concern:*

Be it known that I, FRANK M. STANLEY, of Guthrie, in the county of Logan, in the Territory of Oklahoma, have invented a new and useful Improvement in Car-Couplings, of which the following is a full, clear, and exact description.

The object of my invention is to provide a novel and efficient, cheap and durable car coupling, that will engage and interlock with a similar coupling automatically and be adapted for detachment from the side or top of a car; and furthermore, to provide a self-acting hose coupling which will couple its sections at the same time with the car coupling, be held connected thereby, and be detached simultaneously with the release of two car couplings having such attachments.

To these ends my invention consists in the construction of parts and their combination, as is hereinafter described and claimed.

Reference is to be had to the accompanying drawings forming a part of this specification, in which similar letters of reference indicate corresponding parts in all the figures.

Figure 1:
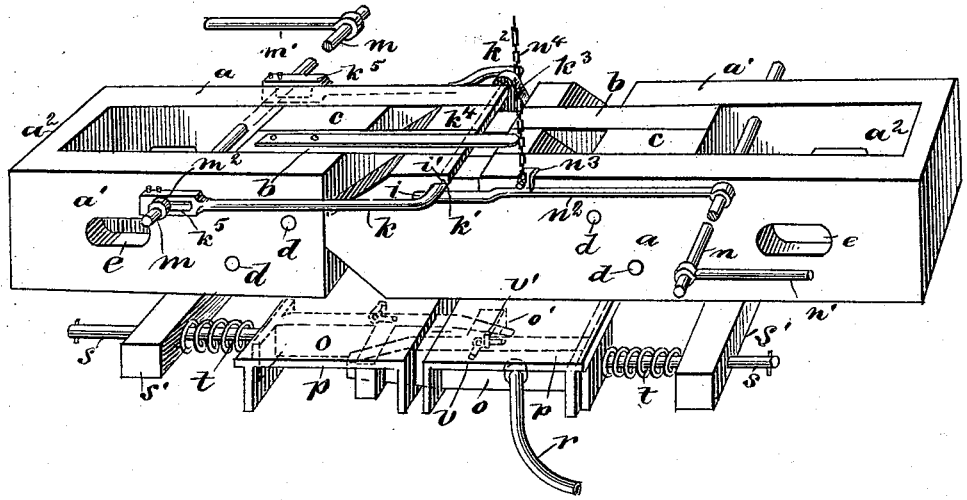
Figure 2:
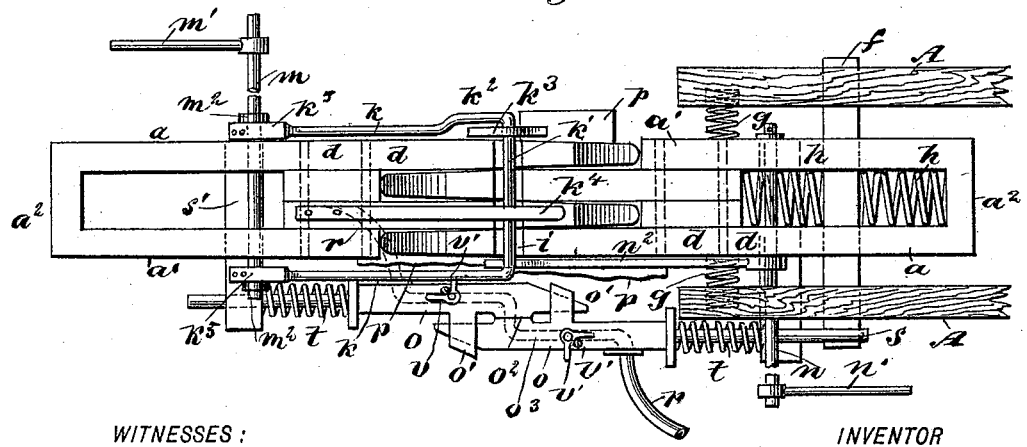

Figure 1 is a perspective view of two couplings having the improvements in coupled adjustment, and the coacting hose coupling sections thereon in a similar condition; Fig. 2 is a plan view of the parts shown in Fig. 1, broken away to display the hose coupling below; Fig. 3 represents two of the improved car couplings in perspective and detached; Fig. 4 is a side view of the two couplings shown in Fig. 3, in coupled adjustment; Fig. 5 is a front end view of one car coupling, a hose coupling section, car timbers that support these parts, and a transverse supporting plate for the hose coupling section broken away; Fig. 6 is an enlarged, broken, and detached detail of construction that is part of the car coupling; Fig. 7 is an enlarged, broken top view of one section of the hose coupling attachment, and a connecting part in section; and Fig. 8 is an enlarged transverse section of parts on the line 8 in Fig. 7.

The drawhead of the coupling is formed with two parallel limbs $a$ $a'$ spaced apart a proper distance by a transverse portion $a^2$. One limb $a$, is sloped on the top and bottom sides at the front end leaving the terminal blunt, the front end of the other limb $a'$ which is shorter than the limb $a$, being cut at a right angle to the sides so as to form a vertical abutment in service, as will be further described.

Between the limbs $a$ $a'$, an extension piece $b$, and a spacing block $c$, are introduced and secured, the thickness of which taken together fills the space between the outer limbs. The piece $b$ and block $c$ lap upon the short limb $a'$, sufficiently to permit them to be secured in place by bolts or rivets $d$, that extend through the longer limb $a$, also, as shown in Figs. 1 and 2. The limbs $a$ $a'$, extension piece or limb $b$, and spacing block $c$, are of equal thickness and width, so that a similarly formed drawhead will be adapted to enter its extension limb $b$, between a similar piece and the longer limb $a$ of an engaged drawhead, their top and bottom edges corresponding with those of the latter, the extension limb having such a forward projection as will give to the parts $a'$, $b$, a length equal to the limb $a$, the free end of the extension limb being sloped on the top and bottom edges to shape it like the limb $a$. At a proper distance from the ends of the limbs $a$ $a'$, these parts are transversely slotted as at $e$, in Fig. 1, said slots which are elongated longitudinally of the limbs and located near their center of width, being designed to receive a transverse bar $f$, that also penetrates the parallel string pieces A, of the car frame between which the coupling is thus held near the car end so as to project therefrom as indicated at the right side of Fig. 2. The cross bar $f$ is fastened to the string pieces A, and loosely engages the limbs $a$ $a'$, the latter being laterally supported by the springs $g$, that are located between the string pieces and limbs, centering the latter normally, free to yield in service toward either side of the car, which is essential when a coupled train is running on a curve.

Between the nearest ends of the extension limb $b$, spacing block $c$, and edge of the cross bar $f$, a buffer spring $h$, is introduced, a similar spring being secured between the other edge of the bar and the transverse wall $a^2$ of the drawhead, so that the latter will be cushioned against percussion and draft strain by the disposition of these springs.

Across the limbs $a$ $a'$ of the drawhead at a proper distance from their front ends, a deep locking groove $i$ is formed in each limb so as to align with each other, the use of which will be explained, said grooves on their front sides being laterally formed so as to produce overhanging lips or flanges $i'$.

The coupling device provided for a detachable connection of two similar drawheads constructed as has been described, consists of a bail loop having two limbs $k$ integrally joined by a transverse straight bar $k'$, the ends of the limbs having elongated enlargements $k^5$ that are each longitudinally slotted to receive and be secured to a box $m^3$, placed loosely upon a rock shaft $m$, which is journaled in holes formed to receive it in the limbs $a$, $a'$, of the drawhead, and said shaft being laterally projected beyond the side of the car has a lever $m'$, secured upon it near the outer end, which furnishes means to rock the shaft and lift or depress the coupling bail loop, that from its manner of connection with the shaft may be slid a limited distance longitudinally. The rock shaft $m'$ is so placed as to permit the portion $k'$, of the coupling bail to freely enter the transverse grooves $i$ in a similar drawhead when two cars having the improvement are to be coupled, and to this end are made to approach so that the drawheads engage with each other as shown in Figs. 1 and 2, the cross bar $k'$, interlocking below the lips $i'$, when draft strain is applied.

On one drawhead of two that are to be coupled, a shaft $n$, is transversely and loosely secured, one end portion of which projects beyond the side of the car whereon the drawhead is sustained, a lever $n'$ affixed on this end of the rod enabling an operator to rotatably move the shaft; and at a proper point there is a lifter arm $n^2$ secured by one end upon the shaft $n$, so as to allow it to project toward and hook beneath a bail loop on another coupling and thus be adapted to lift the latter from the locking groove $i$, if the shaft $n$ is partly rotated in a proper direction.

Upon one limb $k$, of the coupling loop $k, k'$, a prop piece $k^3$, is loosely suspended, near the junction of the limb with the cross bar $k'$, said link having a proper bend $k^2$, formed in it to allow the prop piece to swing freely. There is a plate spring $k^4$, provided, which is secured upon the limb extension $b$, and projects forwardly above the bar $k'$, of the coupling bail loop so as to prevent it from lifting too high, said spring yielding enough to allow the loop to enter the transverse grooves $i$, of an opposing drawhead. There is a finger piece or pad $n^3$, formed on the lifter arm $n^2$, which rests upon the limb $a$ of the drawhead and prevents an improper depression of the arm, which latter has its front end curved downwardly and forwardly so as to adapt it to glide below the bar $k'$ of the coupling bail-loop when two couplings of the improved form are made to couple with each other. From the side of the pad $n^3$ a rod or chain $n^4$ is upwardly extended to be supported above on the car body (not shown) so that the same may be reached from the car roof and by draft upon it cause the elevation of the lifter arm $n^2$ when two cars are to be uncoupled, a rocking movement of the lever $n'$, effecting the same purpose from the side of the car.

When two of the improved car couplings are made to approach each other so as to be connected, the limb $a$ on one drawhead will impinge upon the front end of the shorter limb $a'$ of the other drawhead, the extension $b$ of the latter passing inwardly between the limb $a$ and portion $b$ of the similar drawhead engaged thereby, the spacing blocks $c$ providing room between the parts to permit such an engagement. And when the limbs $a$ on each drawhead collide with the limbs $a'$, the shock sustained is transferred to the buffer springs and thereby neutralized. When two cars having this form of coupling are connected, the transverse portion $k'$, of the coupling bail loop will be drawn below the lips or flanges $i'$, so that a secure coupling of two drawheads is afforded, to release which requires that the train be stopped and the loop slid forwardly.

Below two car couplings of the improved construction a half section $o$ of a hose coupling is supported on each car coupling as shown in Figs. 1 and 2, these coupling sections having a longitudinal sliding engagement with a bracket frame $p$, that is secured below upon each drawhead and laterally projected from the same so as to support the coupling sections in a position that will permit free access thereto if this is necessary for repairs. The hose coupling sections $o$ are alike, and each consists of a preferably rectangular elongated body having a lateral projection $o'$, on one side, which projections are apertured to receive the front ends of the sections as indicated in Fig. 2, these ends being tapered on the outer sides, and the apertures similarly shaped on the sides that engage the sloped walls of the sections when these are slid together, so that the act of bringing the two coupling sections into engagement will cause a faced joint on one section to bear upon a similar joint on the other section as at $o^2$ in Fig. 2, and afford a steam or air tight junction between the parts. From the lateral joints $o^2$ there is an axial steam or air passage extended toward the rear of each hose coupling section and laterally diverged at the rear end so as to tap the side and receive the terminal of a flexible hose $r$, which if designed to supply air brakes, is led from a proper source of supply for air, the junctions afforded by the coupling sections rendering the line of hose continuous throughout a train of cars.

Each hose coupling section $o$, is provided with a longitudinally extending guide rod $s$, which is supported to slide through a bracket arm $s'$, the rod having a central engagement with the rear end of the body it is extended from and aiding its support. There is a spiral spring $t$, placed upon each rod $s$ which impinges on the body of the coupling section and also upon the arm $s'$, so as to cushion the end thrust of the body when two coupling sections are brought together simultaneously with the engagement of car coupling drawheads upon which they are supported.

The hose coupling sections o, are each provided with a plug valve u, that is secured with an air or steam tight joint therein free to rotate. Said plugs are located transversely of the longitudinal passages $o^3$ in the coupling sections, and are perforated to register therewith, and thus allow air or steam to traverse the passages when the plugs are properly adjusted to align their orifices with them.

Upon the projecting end portions of each of the plugs u, a tripping head v is secured, which is provided with two arms that are in the same horizontal plane and projected at a right angle or ninety degrees distant from each other, and between these arms on each plug valve an abutment pin $v'$, is located which depends from the bracket frame p, that supports the coupling section, the position of these pins shown in Figs. 4 and 5, plainly causing the plug valves to be adjusted to align their orifices with the passages in the bodies o, when the two sections of the hose coupling are brought together, and the bail loop k, k', of the car coupling is interlocked with the groove in a coupled drawhead of another car coupling of the same kind, which will thus automatically open a continuous passage for air through the line of hose.

The arm on the plug valve u, of a hose coupling section that has been impinged upon by the depending pin $v'$ to open a passage for air or steam as stated, will be rocked into alignment with the body of the coupling section, as shown in Fig. 2, and the other arm on the tripping head be outwardly projected so that the pin will strike on this projected arm and rock it in the direction indicated by dotted lines in Fig. 4, when the car couplings are released, and the hose coupling sections withdrawn from each other simultaneously with the separation of the car couplings; this vibration of the arms on the plug valves u, closing their orifices so as to seal the ends of the hose sections when the hose coupling sections are detached from each other.

Having thus described my invention, what I claim as new and desire to secure by Letters Patent, is—

1. A drawhead comprising two parallel limbs, one offset to produce an abutment shoulder at its outer end, and a spacing block between the limbs, all secured together, substantially as described.

2. A drawhead comprising two integral parallel limbs, one shorter than the other, an extension limb lapped upon the inner side of the shorter limb, and a spacing block between the latter and the extension limb, all secured together, substantially as described.

3. A drawhead comprising two integral parallel limbs one shorter than the other, an extension limb lapped upon the shorter limb on its inner side, and a spacing block between the latter and the extension limb, all secured together, the longer limb and extension limb being tapered at the front end and both grooved transversely on the upper side near the front end, substantially as described.

4. A drawhead, comprising two integral parallel limbs, one shorter than the other, an extension limb lapped upon the inner side of the shorter limb, and a spacing block between the latter and the extension limb, all secured together, a bail loop pivoted in the limbs of the drawhead, and means for rocking the bail loop, substantially as described.

5. The combination with a drawhead constructed substantially as described, of a supporting cross bar located in longitudinal slots in parallel limbs of the drawhead, and buffer springs adapted to cushion end thrust and draft strain on the drawhead, substantially as described.

6. The combination with a drawhead comprising parallel limbs tapered at the front end, transversely grooved on top near the front end, and held apart by a spacing block, of a transverse rock shaft on the drawhead, a lever on the outer end of the shaft, a lifting arm on the lever projected forwardly and adapted, when rocked, to release a coupling bail loop of an opposing drawhead from its groove, substantially as described.

7. The combination with a drawhead having spaced parallel limbs, of a bail loop secured on a transverse rock shaft thereon, adapted to interlock with lipped cross grooves in limbs of a similar drawhead, a plate spring pressing the bail loop, and a lever on the end of the rock shaft, substantially as described.

FRANK M. STANLEY.

Witnesses:
FRANK RECTOR,
T. R. PALMER.